United States Patent

Moriyasu et al.

Patent Number: 5,910,040
Date of Patent: Jun. 8, 1999

[54] METHOD OF CONTROLLING SHAPE AND NC PROCESSING APPARATUS UTILIZING THE METHOD

[75] Inventors: Sei Moriyasu, Tokyo; Hitoshi Ohmori, Wako; Takeo Nakagawa, Wako; Ichirou Yamaguchi, Wako; Jun-Ichi Kato, Wako, all of Japan

[73] Assignee: The Institute of Physical and Chemical Research, Saitama, Japan

[21] Appl. No.: 08/765,574

[22] PCT Filed: Apr. 14, 1996

[86] PCT No.: PCT/JP96/02294

§ 371 Date: Dec. 26, 1996

§ 102(e) Date: Dec. 26, 1996

[87] PCT Pub. No.: WO97/06922

PCT Pub. Date: Feb. 27, 1997

[30] Foreign Application Priority Data

Aug. 15, 1995 [JP] Japan .................................. 7-208068

[51] Int. Cl.$^6$ .................................................. B24B 49/00
[52] U.S. Cl. .................................... 451/5; 451/9; 451/21; 451/56
[58] Field of Search .................................... 451/5, 8, 9, 10, 451/11, 21, 56, 72, 443

[56] References Cited

U.S. PATENT DOCUMENTS

| | | | |
|---|---|---|---|
| 5,119,595 | 6/1992 | Ushiyama et al. | 451/256 |
| 5,472,371 | 12/1995 | Yamakura et al. | 451/72 X |
| 5,547,414 | 8/1996 | Ohmori | 451/8 X |
| 5,639,363 | 6/1997 | Ohmori et al. . | |
| 5,660,579 | 8/1997 | Nakayama et al. | 451/72 X |
| 5,667,646 | 9/1997 | Tomotaki . | |
| 5,683,290 | 11/1997 | Kanda et al. | 451/72 |

FOREIGN PATENT DOCUMENTS

| | | |
|---|---|---|
| A-59-142045 | 8/1984 | Japan . |
| A-6-344246 | 12/1994 | Japan . |
| A-7-60642 | 3/1995 | Japan . |

*Primary Examiner*—Timothy V. Eley
*Attorney, Agent, or Firm*—Griffin, Butler Whisenhunt & Szipl, LLP

[57] ABSTRACT

An electrode (4) is disposed spaced away from and in facing relation with an electrically conductive grinding wheel (2). There is applied a voltage across the grinding wheel and the electrode with making electrically conductive fluid (7) flow between the grinding wheel and the electrode. A position of the grinding wheel is numerically controlled with the grinding wheel being dressed by electrolysis to thereby grind a work with the grinding wheel. The work is ground in accordance with command data $Zx^{(i)}$, and then a shape of a ground surface is measured by means of a measuring device (12). The measurement data is filtered to thereby record shape error data $e_x^{(i)}$. There is established new command data $Zx^{(i+1)}$ by adding compensation, and then the work is ground again with the thus established new command data. The compensation refers to past command data, and determines new command data to be equal to an expected value of the past command data. In accordance with the present invention, it is possible to obtain higher shape accuracy with the less number of processing steps, extract real shape indicating signals out of measurement data, and avoid misregistration of a work which would be caused by fixing/removing.

9 Claims, 11 Drawing Sheets

ESTABLISHMENT OF COMPENSATION DATA

GENERAL EQUATION: $\quad Zx^{(i+1)} = Zx^{(i)} - K \cdot ex^{(i)}$ \hfill (1)

EXPECTED VALUE: $\quad Zx^{(i+1)} = \sum_i (Zx^{(i)} - ex^{(i)})/i$ \hfill (2)

THE FOLLOWING RELATION IS ESTABLISHED BASED ON (2)

$Zx^{(2)} = Zx^{(1)} - ex^{(1)}$ $$Zx^{(3)} = \{(Zx^{(2)} - ex^{(2)}) + (Zx^{(1)} - ex^{(1)})\}/2$$
$$= \{(Zx^{(2)} - ex^{(2)}) + 1 \cdot Zx^{(2)}\}/2$$
$$= Zx^{(2)} - ex^{(2)}/2$$

$$Zx^{(4)} = \{(Zx^{(3)} - ex^{(3)}) + (Zx^{(2)} - ex^{(2)}) + (Zx^{(1)} - ex^{(1)})\}/3$$
$$= \{(Zx^{(3)} - ex^{(3)}) + 2 \cdot Zx^{(3)}\}/3$$
$$= Zx^{(3)} - ex^{(3)}/3$$

. . . . . . . . . . . . . . . . . . . . . . . . . . . . .

$$Zx^{(i+1)} = \{(Zx^{(i)} - ex^{(i)}) + (Zx^{(i+1)} - ex^{(i+1)}) + \cdots$$
$$\cdots + (Zx^{(2)} - ex^{(2)}) + (Zx^{(1)} - ex^{(1)})\}/i$$
$$= \{(Zx^{(i)} - ex^{(i)}) + (i-1) \cdot Zx^{(i)}\}/i$$
$$= Zx^{(i)} - ex^{(i)}/i \hfill (3)$$

THAT IS, THE EQUATION (2) MAY BE TRANSFORMED TO THE EQUATION (3) WHICH IS UNDERSTOOD TO CORRESPOND TO THE EQUATION (1) WHERE K=1/i.

FIG.5

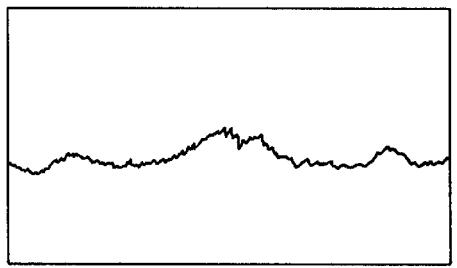
FIG.8A  ORIGINAL [CYCLE/100mm]
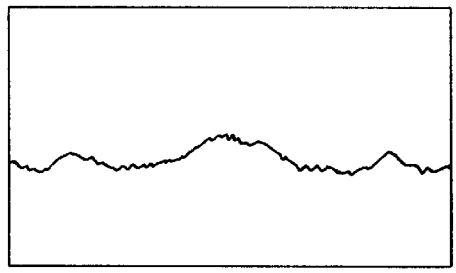
FIG.8B  128-512 [CYCLE/100mm]
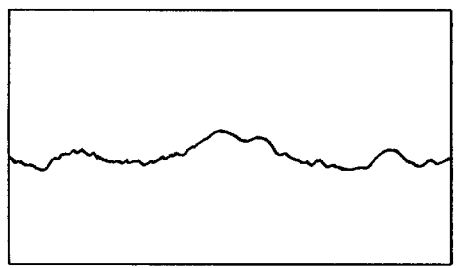
FIG.8C  64-512 [CYCLE/100mm]
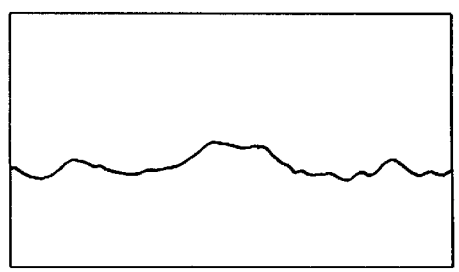
FIG.8D  32-512 [CYCLE/100mm]

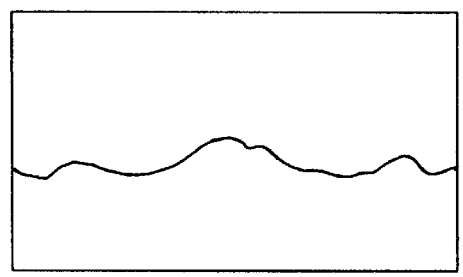
FIG.8E    16-512
          [CYCLE/100mm]
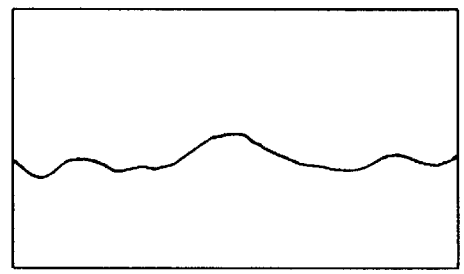
FIG.8F    [CYCLE/100mm] 8-512
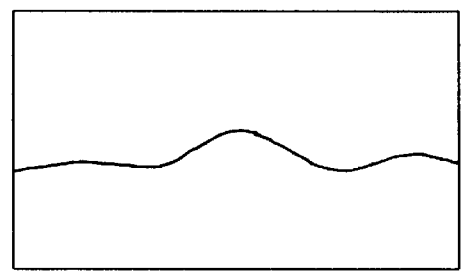
FIG.8G    4-512
          [CYCLE/100mm]
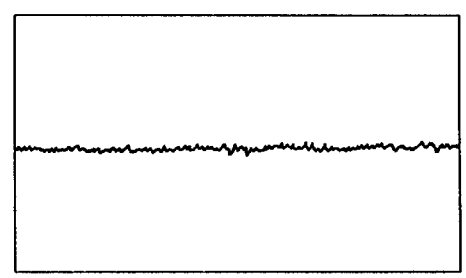
FIG.8H    [CYCLE/100mm] 0-16

METHOD OF CONTROLLING SHAPE AND NC PROCESSING APPARATUS UTILIZING THE METHOD

TECHNICAL FIELD

The present invention relates to a method of controlling a shape in electrolytic dressing grinding, and also to a numerical control processing apparatus.

BACKGROUND ART

With recent development of scientific technology, a technique for processing a work with ultra-high precision has been increasingly demanded. As electrolytic grinding technique for satisfying such demand, the applicant has developed and suggested electrolytic inprocess dressing (hereinafter, "ELID") grinding ("Latest technology trend on mirror surface grinding", Riken Symposium, Mar. 5, 1991).

In the above mentioned ELID grinding, there is used an electrically conductive grinding wheel instead of an electrode as in conventional electrolytic grinding. In the ELID grinding, an electrode is disposed spaced away from and facing the grinding wheel, and a voltage is applied across the grinding wheel and the electrode while making electrically conductive fluid flow between the grinding wheel and the electrode. A work is ground with the grinding wheel with the grinding wheel being dressed by electrolysis. In ELID grinding, even if a finer abrasive grain is used, blinding does not occur in a grinding wheel due to setting of abrasive grains caused by electrolytic dressing. Hence, the use of finer abrasive grain makes it possible to obtain a superior ground surface like a mirror surface by grinding. Thus, ELID grinding can maintain the sharpness of a grinding wheel in a range from high efficiency grinding to mirror surface grinding, and is expected to be applied to various grinding techniques as a means capable of forming a surface with high accuracy in a short period of time, which was impossible by conventional methods.

Optical elements (such as a lens and a mirror) having aspheric surfaces which are typical of highly precise parts and are required to have not only small surface roughness but also high precision shapes. In order to grind such optical elements with the above mentioned ELID grinding, an electrically conductive grinding wheel formed with a surface having a desired shape (for instance, an aspheric surface) is indispensable. However, a problem has been that such a grinding wheel is difficult to make, takes too much time and is costly. In addition, even if a grinding wheel is formed with a desired surface, the surface shape may be changed due to abrasion and dressing occurring in use, and hence it has been impossible to maintain high accuracy while grinding a work.

Thus, there has been suggested an NC processing apparatus for ELID-grinding a work to thereby have a desired surface shape by numerically controlling a position of a grinding wheel. Such an NC processing apparatus has already been used by some people.

However, there arose a problem that it was impossible to have a desired, high shape accuracy by single grinding due to elastic deformation of a work (material to be ground) and a grinding wheel, even if the above mentioned NC processing apparatus was used. Thus, in order to accomplish high shape accuracy, a dimension of a shape of a ground work was measured, and then NC input data was compensated based on the measurement data. Then, a work was ground repeatedly. Thus, there were problems that it was necessary to repeat grinding a work for obtaining a desired shape accuracy, which took much time, and that compensation failed in many cases since compensation data was established by the intuition of those skilled in the art or by trial and error.

The data obtained by measuring a ground work shape contains various signal elements as well as true signals transmitted from a target. For instance, various signal elements include false signals transmitted from material other than a target, fluctuation in sensitivity of a sensor due to variation of measurement environment, and thermal drift of an electric system. If rough grinding is carried out in an initial stage for obtaining higher efficiency in grinding, the measurement data contains fine signal waves indicating roughness to be obtained when a rough, ground surface is measured. Thus, it is difficult to grasp a true surface shape. For these reasons, there were problems that establishment of compensation data from measurement data was difficult even for those skilled in the art, took much time, and was likely to contain a lot of compensation errors.

In addition, it was necessary in a conventional method for measuring a shape of a ground work to remove the work out of an NC processing apparatus and attach the work to an appropriate measurement device to thereby measure a shape of the work. Then, the work had to be mounted again onto an NC processing apparatus. Since a work may be disposed significantly out of position each time it is mounted/ removed, there arose the problem that it was difficult to adjust the position of a work and that such position adjustment took a lot of time.

The present invention is made in order to solve the above mentioned problems. Namely, it is an object of the present invention to provide a method of controlling a shape of a work in ELID-grinding which method is capable of accomplishing higher shape accuracy with a smaller number of processing steps by using an NC processing apparatus, and an NC processing apparatus utilizing the method. Another object of the present invention is to provide a method of controlling a shape of a work which method is capable of extracting true shape signals out of measurement data. A further object of the present invention is to provide an NC processing apparatus for ELID-grinding which is capable of avoiding the mispositioning of a work caused by attaching/ removing a work.

DISCLOSURE OF THE INVENTION

In accordance with the present invention, there is provided a method of grinding a work with a grinding wheel to control a shape of the work, including the steps of disposing an electrode spaced away from and facing an electrically conductive grinding wheel, applying a voltage across the grinding wheel and the electrode while making electrically conductive fluid flow between the grinding wheel and the electrode, and numerically controlling position of the grinding wheel with the grinding wheel being dressed by electrolysis, the method characterized by the steps of: grinding the work in accordance with command data $Zx^{(i)}$, measuring a shape of a ground surface to obtain measurement data, filtering the measurement data to obtain shape error data $e_x^{(i)}$, establishing new command data $Zx^{(i+1)}$ by compensating the command data $Zx^{(i)}$ based on said shape error data $e_x^{(i)}$, and grinding the work again in accordance with command data $Zx^{(i+1)}$.

In the above mentioned method, the error data $e_x^{(i)}$ is filtered, and then compensation is added into the error data to thereby establish new command data $Zx^{(i+1)}$. Then, a work is ground again. Hence, it is possible to extract true shape signals by filtering, and make gradual approach to higher shape accuracy by compensation.

In a preferred embodiment, the compensation includes the steps of referring to past command data and (shape) error data, and determining new command data to be equal to an expected value of a difference between the past command data and error data. This embodiment makes it possible to establish compensation data without the intuition of those skilled in the art and trial and error, and to significantly reduce error.

The compensation includes the steps of referring to all the i number of past command data $Zx^{(i)}$ and error data $e_x^{(i)}$, and determining new command data $Zx^{(i+1)}$ in accordance with the equation: $Zx^{(i+1)} = Zx^{(i)} - e_x^{(i)}/i$. This embodiment makes it unnecessary to repeat calculations based on a lot of data, thereby making it possible to significantly shorten the time required for calculation.

It is preferable that the compensation includes the steps of: removing a set of data including error data having the greatest absolute value out of two or three error data having a common sign among threes sets of data: sets of command data and error data obtained as yet, $(Zx', e_x')$ and $(Zx'', ex'')$, and $(Zx^{(i)}, ex^{(i)})$ obtained in an i-th experiment ($i \geq 3$); and determining as compensation data a value obtained by, if the other two sets of data includes an error having a common sign, subtracting K times later mentioned smaller error from command value of a set of data including a smaller error, or determining new command data $Zx^{(i+1)}$ to be equal to an x-axis value of an intersection of an x-axis with a line passing through the two points in an x-y rectangular coordinate system, if the other two sets of data includes an error having an opposite sign. This method makes it possible to facilitate convergence, and accomplish high shape accuracy with the smaller number of processing steps.

The filtering is carried out by means of a low pass filter utilizing frequency-domain technique by fast Fourier transform. It is preferable that the low pass filter removes higher-order frequency ingredients ranging from about 16 to about 64 cycle/100 mm. This method makes it possible to eliminate false signals contained in measurement data, fluctuation in sensitivity of a sensor, thermal drift of an electric system, and higher-order frequency ingredients of fine signal waves indicating roughness to thereby extract true shape signals.

In accordance with the present invention, there is further provided an NC processing apparatus comprising: an electrically conductive grinding wheel for grinding a work; an electrode spaced away from and facing the grinding wheel, and a device for applying a voltage across the grinding wheel and the electrode. The work is ground with the grinding wheel by the steps of making electrically conductive fluid flow between the grinding wheel and the electrode, dressing the grinding wheel by electrolysis, and numerically controlling position of the grinding wheel, the NC processing apparatus being characterized by a shape measuring device for measuring a shape of a ground surface, and a compensation device for compensating for command data to be used for numerical control, the work being ground with command data $Zx^{(i)}$, a shape of a ground surface being measured with the shape measuring device, measurement data being filtered to record shape error data $e_x^{(i)}$, establishing new command data $Zx^{(i+1)}$ by adding compensation by means of the compensation device, and the work being ground again with the thus established new command data.

In accordance with the above mentioned apparatus, it is possible to measure a shape of a ground work by means of a shape measuring device with a work being mounted on the apparatus. Thus, it is possible to avoid mispositioning of a work which would be caused by mounting/removing of the work, and thus it is no longer necessary to adjust a position of the work.

BRIEF DESCRIPTION OF THE DRAWINGS

FIG. 5 shows the relation among the equations 1, 2 and 3.

FIG. 8 illustrates a set of post-filtering measurement data obtained when $\omega_0$ in the equation 5 is varied.

BEST MODE FOR CARRYING OUT THE INVENTION

Hereinbelow will be described the preferred embodiments made in accordance with the present invention with reference to drawings.

Figure 1:
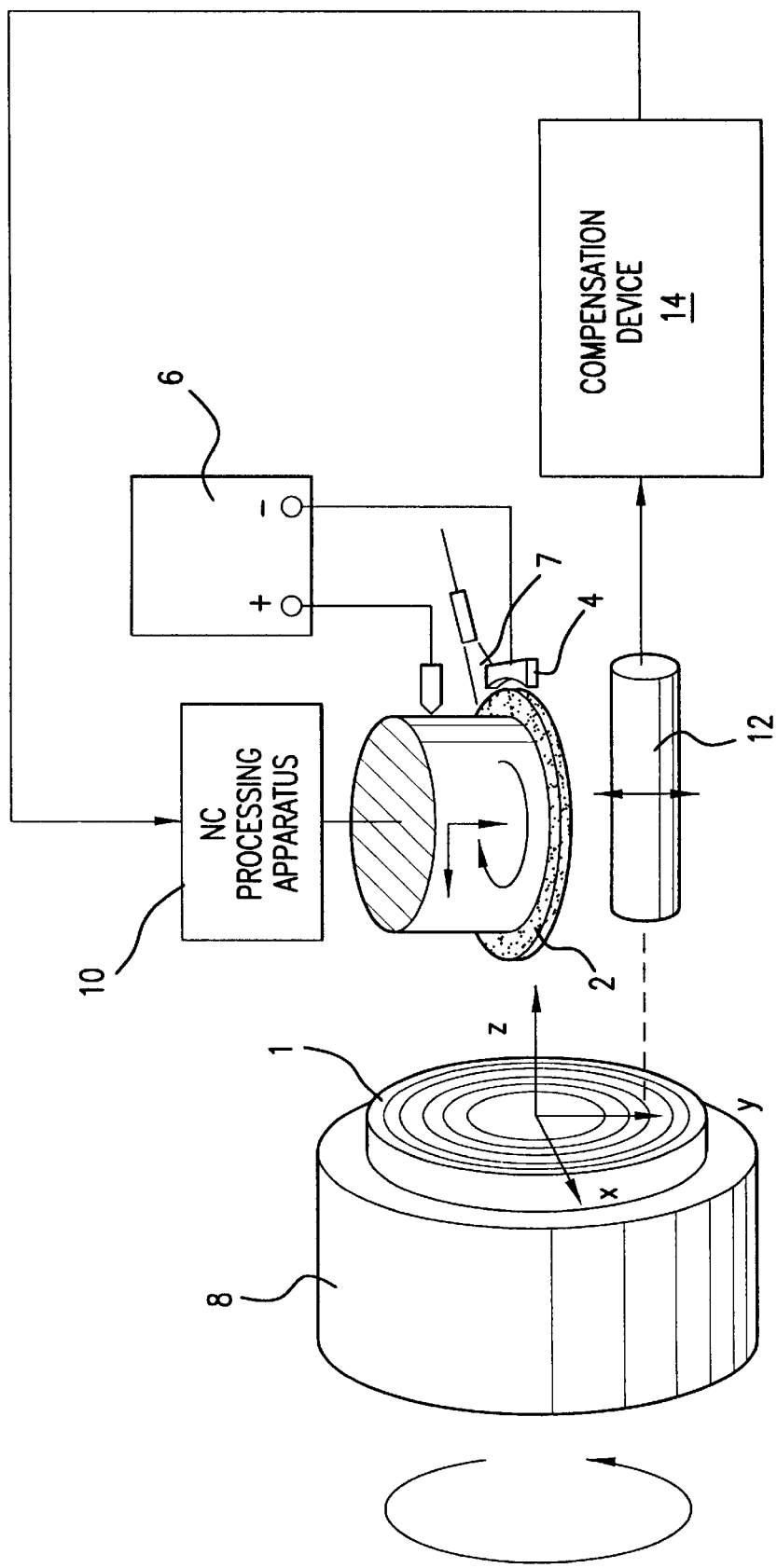
FIG. 1 is a schematic view of an NC processing apparatus made in accordance with the present invention.

FIG. 1 is a schematic view illustrating an NC processing apparatus made in accordance with the present invention. In FIG. 1, the NC processing apparatus 10 includes an electrically conductive grinding wheel 2 for grinding a work 1, an electrode 4 spaced away from and facing the grinding wheel 2, and a device 6 for applying a voltage across the grinding wheel 2 and the electrode 4. The grinding wheel is numerically controlled with respect to its position. Electrically conductive fluid 7 is made to flow between the grinding wheel 2 and the electrode 4 and the grinding wheel 2 is dressed by electrolysis, to thereby grind (ELID-grind) the work 1 with the grinding wheel 2. In FIG. 1, the work 1 is mounted on a rotary table 8 so that the work 1 is able to rotate about a z-axis and move in a z-axis direction. The grinding wheel 2 is able to rotate about an axis which is parallel to a y-axis and move in an x-axis direction so that a position (processing position) at which the grinding wheel is in contact with the work 1 is able to be numerically controlled.

The NC processing apparatus 10 in accordance with the present invention further includes a shape measuring device 12 for measuring a shape of the ground surface, and a compensation device 14 for compensating for command data to be used for numerical control. The shape measuring device 12 is comprised of, for instance, a digital contracer or a laser-micro each having high measurement resolution. The shape measuring device 12 is positioned so that it does not interfere with grinding of the work 1 by the grinding wheel 2, and is able to accurately observe a shape of a ground surface after completion of grinding without removing the work 1 out of the rotary table 8. The compensation device 14 compensates for command data based on the error data $e_x^{(i)}$ obtained by filtering the measurement data, to thereby establish new command data $Zx^{(i+1)}$. The above mentioned arrangement makes it possible to avoid mispositioning of the work which would be caused by mounting/removing of the work, and thus it is no longer necessary to adjust the position of the work.

Figure 2:
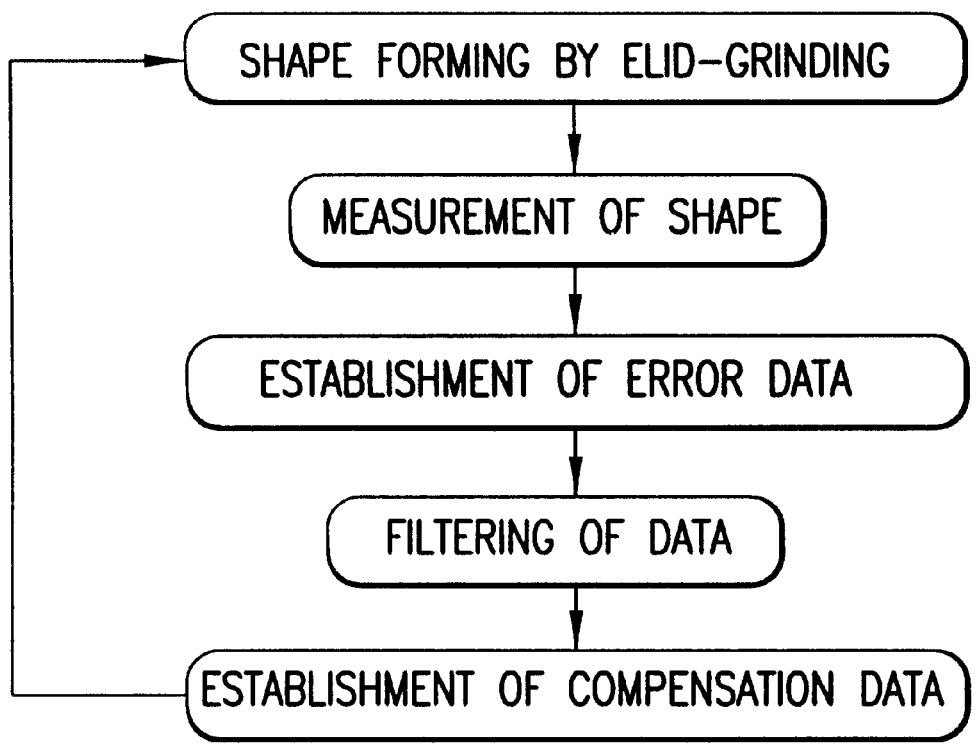
FIG. 2 is a flow chart of a shape controlling method in accordance with the present invention.

FIG. 2 is a flow chart of a shape controlling method in accordance with the present invention. As illustrated, after a desired shape is established by the above mentioned ELID-grinding, the shape is observed by means of a shape measuring device having high resolution for measurement. The obtained shape error data is filtered, followed by establishment of NC data into which compensation is added. Then, the work is ground into a new shape in accordance with the new NC data. By repeating these steps, it is possible to reduce shape error, and make the work approach a desired shape.

Figure 3:
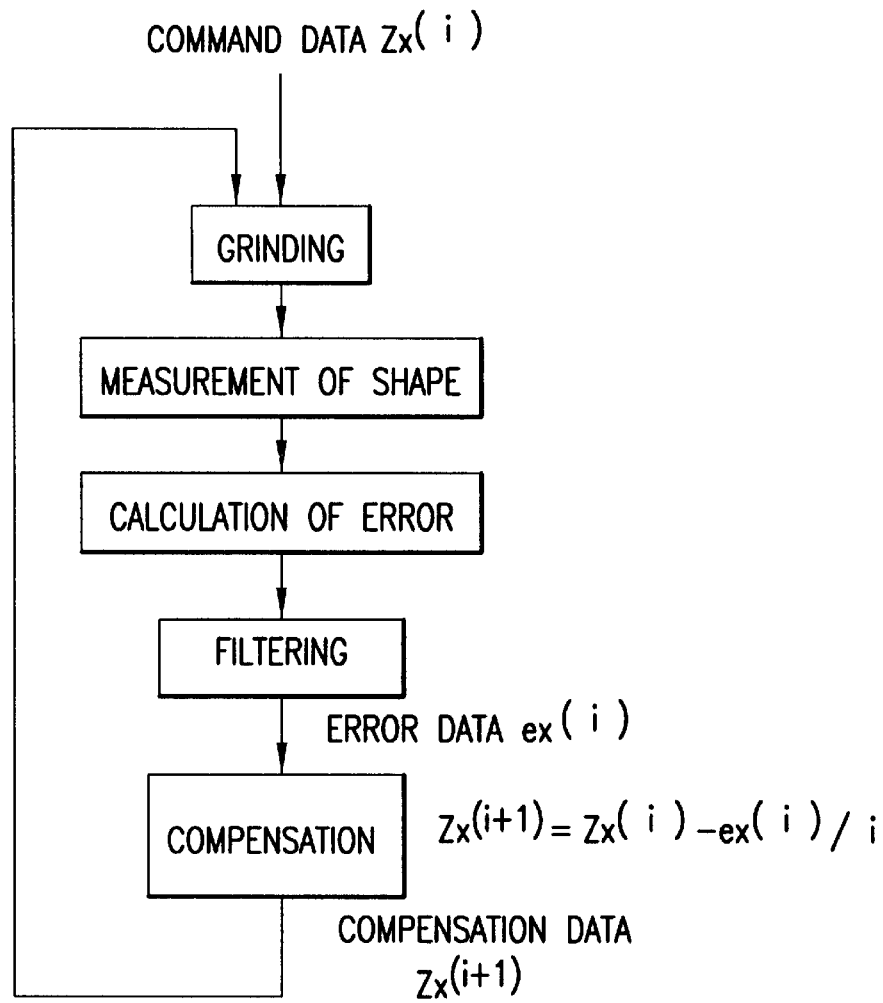
FIG. 3 is a first control flow chart of the first embodiment of a shape controlling method in accordance with the present invention.

FIG. 3 is a first control flow chart of the first embodiment of a shape controlling method in accordance with the present invention. As illustrated, the work is ground into a shape in accordance with certain command data $Zx^{(i)}$. Then, the work is measured with respect to its shape, followed by calculation of shape error data $e_x^{(i)}$ (hereinafter, referred to simply as error data). The error data is filtered, and then is newly recorded as error data to be used for establishment of compensation data. Herein, there are prepared sets of the command data $Zx^{(i)}$ and the error data $e_x^{(i)}$ for all command points x, and it is assumed that the command data and error data obtained in i-th grinding at a command point x are indicated with $Zx^{(i)}$ and $e_x^{(i)}$, respectively. Herein, (i+1)-th command data $Zx^{(i+1)}$ is given by the following equation.
[Equation 1]

$$Zx^{(i+1)} = \sum_{j=1}^{n}(Zx^{(j)} - ex^{(j)})/n$$

This equation means that the n number of past command data is referred to, and then an expected value of those command data is given as new command data. This method is characterized by being less influenced by error. It should be noted that data which is determined to include great error may not be used as reference data.

In the case that the i number of all past command data $Zx^{(i+1)}$ is to be referred to, (i+1)th command data $Zx^{(i+1)}$ is given by the following equation.
[Equation 2]

$$Zx^{(i+1)} = Zx^{(i)} - e_x^{(i)}/i$$

In general, the (i+1)th command data $Zx^{(i+1)}$ is represented with the following equation by using a coefficient K defined by command point x, the number of grinding steps i, r.p.m. of a work w, feeding rate of a grinding wheel f, i-th command data $Zx^{(i)}$ and so on.
[Equation 3]

$$Zx^{(i+1)} = Zx^{(i)} - Ke_x^{(i)}$$

The equation 2 corresponds to the equation 3 where K=1/i.

Figure 4:
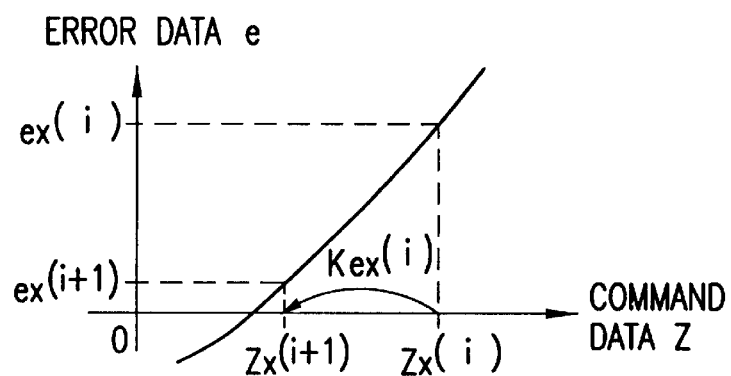
FIG. 4 is a schematic view showing compensation in FIG. 3.

FIG. 4 is a schematic view showing the compensation in FIG. 3. In FIG. 4, the abscissa represents command data Z, whereas the ordinate represents error data e. Supposed that there is unknown relation defined by an equation e=f(Z) between the command data Z and the error data e. The error data is equal to zero at an intersection of the equation with the axis of abscissa.

Accordingly, as illustrated, it is possible to make gradual approach to higher shape accuracy (an intersection with the axis of abscissa) by determining the (i+1)th command data $Zx^{(i+1)}$ based on $Zx^{(i)}$ and $e_x^{(i)}$ using the equations 1 and 2.

FIG. 5 shows relationship among the equations 1, 2 and 3. As illustrated, when the i number of all past command data $Zx^{(i)}$ is to be referred to, the equation 1 (the equation (2) in FIG. 5) for obtaining an expected value is substantially the same as the equation 2 (the equation (3) in FIG. 5) and the equation 3 (the equation (1) in FIG. 5). Thus, by using the equation 2 (or the equation 3) in place of the equation 1, it is possible to make it unnecessary to repeat calculation based on a lot of data, and also possible to significantly reduce calculation time.

Figure 6:
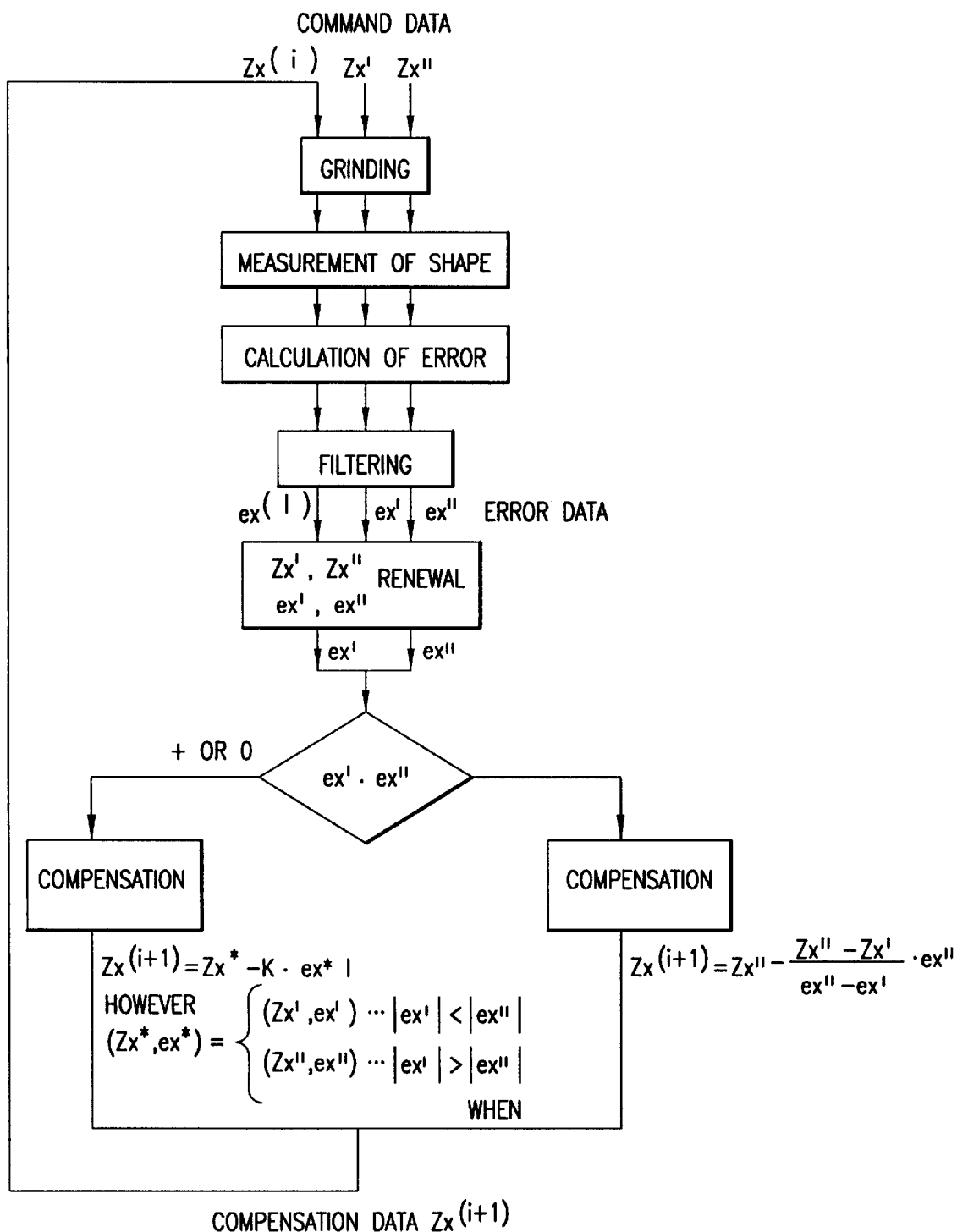
FIG. 6 is a second control flow chart of the second embodiment of a shape controlling method in accordance with the present invention.
Figure 7A:
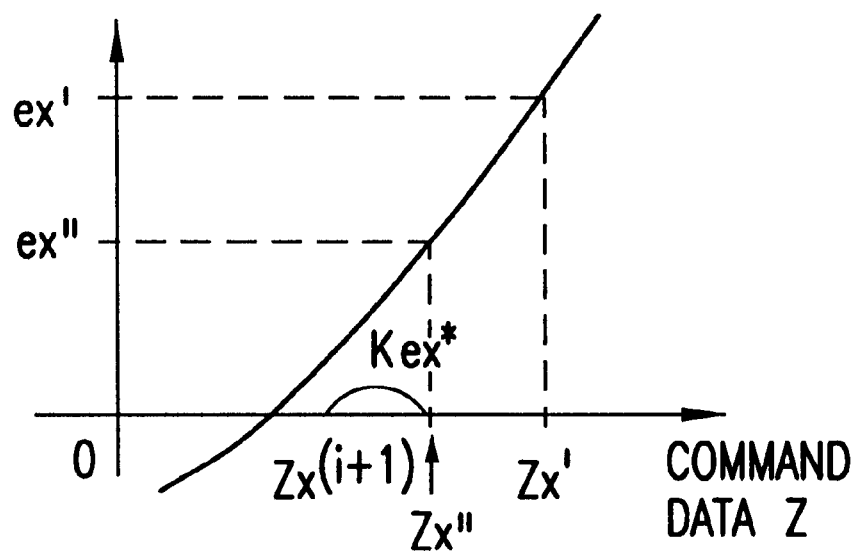
FIG. 7 is a schematic view showing compensation in FIG. 6.

FIG. 6 is a second control flow chart of the second embodiment of a shape controlling method in accordance with the present invention, and FIG. 7 is a schematic view showing the second compensation in FIG. 6. As illustrated in FIG. 6, after grinding a work in accordance with certain command data $Zx^I$, a shape of the work is measured, similarly to the method shown in FIG. 3. Then, there is calculated error data $e_x^I$ by comparing the measurement data to an originally designed shape of a work. After being filtered, the measurement data is newly recorded as error data to be used for establishment of compensation data. Thus, there are prepared sets of the command data $Zx^I$ and error data $e_x^I$ for all the command data. This procedure is repeated again to thereby prepare two sets of command data and error data, each of sets being referred to as $(Zx^I, e_x^I)$ and $(Zx^{II}, e_x^{II})$, respectively.

The errors $e_x^I$ and $e_x^{II}$ are compared to each other at each of command points. If they have a common sign, K times error (later mentioned) is subtracted from command value of a set of data including an smaller absolute value of error, and a thus obtained difference is determined as compensation data (see FIG. 7(A)). Herein, K is either a constant or a figure defined by command point x, the number of grindings i, r.p.m. of a work w, feeding rate of a grinding wheel f, i-th command data $Zx^{(i)}$ and so on, similarly to the first embodiment.

Figure 7B:
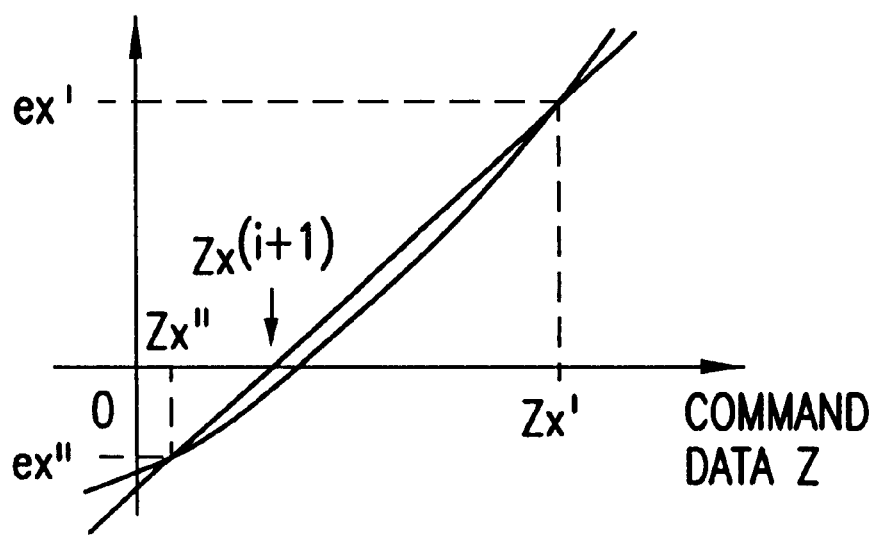

If the errors have an opposite sign, compensation data is given as a value indicated by an intersection (a point at which error=0) of a line connecting the two points to each other on a plane with an axis of command value (see FIG. 7(B)). That is, the new command data $Zx^{(i+1)}$ is given as an x-axis value of an intersection of a line connecting the two points with an x-axis in an x-y rectangular coordinate system.

Then, a work is ground in accordance with the thus obtained compensation data, followed by establishing a set of command data and error data in a similar way. Among the three sets of data, namely the two sets of data previously used and a newly established set of data, a set of data including error data having the greatest absolute value out of two or three error data having a common sign is removed. Then, compensation data is determined based on the other two sets of data in the same way as formerly mentioned. These steps are repeated to thereby approach to a desired shape.

The method is characterized by higher speed convergence relative to the first embodiment. Hence, the method makes it possible to facilitate convergence and provide higher shape accuracy with the smaller number of grindings. The compensation in the present invention may be carried out in accordance with the first or second embodiment or in combination thereof.

Hereinbelow is explained filtering of error data. As mentioned earlier, the measurement data contains various signal elements as well as true signals transmitted from an object to be measured. For instance, false signals coming from other than the target, for example fluctuation in sensitivity of a sensor caused by variation of measurement environment, and thermal drift of electrical system are contained. It is quite important to remove unnecessary signal elements other than true signals transmitted from a target for improving grinding accuracy. In addition, fine signal waves indicating roughness obtained when a roughly ground surface is measured are not necessary for establishing appropriate compensation data, and thus it is absolutely necessary to carry out filtering.

In the present invention, the measurement data is filtrated with a low pass filter by using frequency-domain technique carried out with fast Fourier transform (FFT), to remove higher-order frequency elements to thereby smooth the measurement data. Supposed that measurement data sequence before filtering is represented with x(i) and measurement data sequence after filtering is represented with y(i), there is established the following relation.
[Equation 4]

$$x(i) \xrightarrow{\text{Fourier transform}} X(\omega) \cdot W(\omega) \xrightarrow{\text{reverse Fourier transform}} y(i)$$

Herein, $W(\omega)$ indicates a filter function. Particular frequency ingredients can be extracted or removed in dependence on how a filter function is selected. In the present invention, a filter function is selected as follows.
[Equation 5]

$$W(\omega)=1(\omega<\omega_0) \text{ or } 0(\omega \geq \omega_0)$$

It is preferable to select $\omega_0$ obtained when waveforms measured after filtering are sufficiently smoothed in a command pitch (0.1 mm) in an x-axis direction and sufficiently follow a measured shape.

FIG. 8 illustrates post-filtering measurement data sequences obtained when $\omega_0$ in the equation 5 is varied. In FIG. 8, a graph located uppermost at the left shows measurement data sequence before filtering, and others show measurement data sequence after removing a band of frequency shown below each of graphs. It is understood that higher-order frequency elements such as false signals included in measurement data, fluctuation in sensitivity of a sensor, thermal drift of an electrical system, and fine signal waves indicating roughness can be removed to thereby extract true shape signals by removing higher-order frequency ingredients in the range of about 16 to about 64 cycle/100 mm or greater with the above mentioned low pass filter.

(Experimental Embodiments)

Hereinbelow will be described experimental embodiments made in accordance with the present invention.

EXPERIMENTAL EMBODIMENT 1

A table 1 shows the structure and specification of a shape controlling apparatus used in the first experimental embodiment.

[TABLE 1]

Specification of Apparatus

| | |
|---|---|
| NC Processing Apparatus | Apparatus for Processing Aspheric Surface with Ultra-High Accuracy |
| Grinding Wheel | Cast Iron bond Diamond Grinding Wheel (ø75 × W 3 mm: #1000) |
| ELID Power Source | Electrolytic Dressing Power Source (90V–10A) |
| Work | SiC ceramics (ø100) |
| Shape Measuring Apparatus | Digital Contracer, Laser-Micro meter |
| Grinding Fluid | AFG-M (50 times diluted with tap water) |

As an NC processing apparatus, there was used an apparatus for processing aspheric surface with ultra-high accuracy which had positioning accuracy of 10 nm and which was equipped with an air static pressure bearing. As a grinding wheel, there was used a cast iron bond diamond straight grinding wheel (φ75 mm×W 3 mm) of #1000. Abrasive grains had a diameter of about 15 µm. As a shape measuring apparatus, there was used a digital contracer having a resolution of 25 nm and repeatability of ±0.1 µm. As ELID power source, there was used an exclusively used ELID power source which generates high frequency pulse voltage. As grinding fluid, there was used widely used water-soluble grinding fluid AFG-M diluted 50 times with tap water.

(Method of Experiment)

An experiment was conducted using the system defined by Table 1 under the grinding and ELID conditions shown in Table 2 in accordance with the procedure shown in FIG. 1.

[TABLE 2]

Grinding and ELID conditions

| | |
|---|---|
| Peripheral Speed of Grinding wheel: v (m/min) | 1300 |
| Feeding speed: f (mm/min) | 5 |
| Depth of Grind: d (µm) | 0.5 |
| RPM of Work: w (rpm) | 270 |
| ELID voltage: $E_0$ (V) | 60 |
| Peak Current: Ip (A) | 5 |
| On-Time: τ on (µs) | 1 |
| Off-Time: τ off (µs) | 1 |

There was used a work having a diameter of 100 mm and made of SiC sintered material. For simplicity, the work was ground to a spherical surface having a radius of 2 m. The grinding conditions as shown in Table 2 was kept unchanged for each of grindings. Thereafter, the work was detached from the processing apparatus, and sufficiently cleaned at a surface thereof. Then, a shape of the work was measured by means of a digital contracer. There was established compensation data based on the measurement data by means of a computer, and the thus established compensation data was transmitted to the NC processing apparatus. Then, the work was ground again in accordance with the NC data. These steps were repeated in an experiment. The compensation in this experiment includes the first type compensation shown in the first embodiment and the second type compensation shown in the second embodiment. Namely, the second type compensation was first carried out to thereby find command data which gives shape error having a relatively small absolute value, and then, the shape error was converged by the first type compensation.

(Results of Experiment)

Figure 9A:
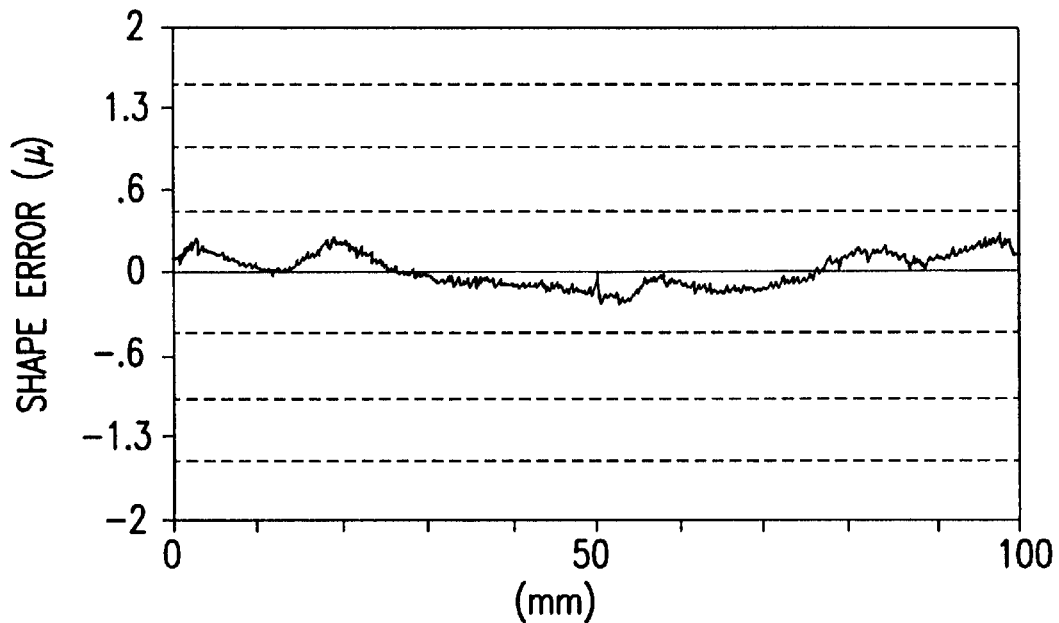
FIG. 9 shows measurement data obtained before and after filtering.
Figure 9B:
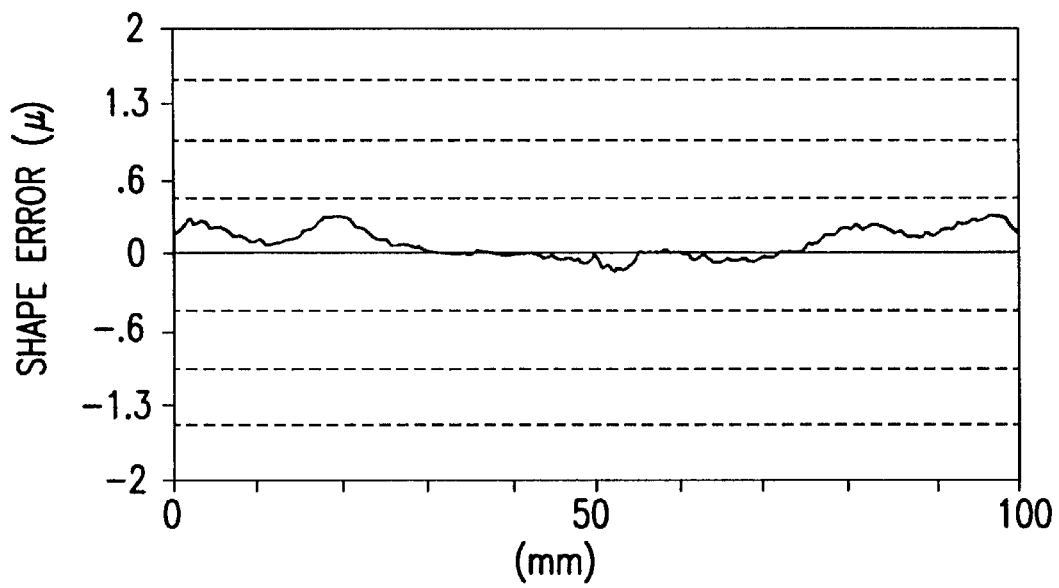

FIGS. 9(A) and (B) show the measurement data obtained before and after the filtering carried out in accordance with the present invention, respectively. It is understood that higher-order frequency ingredients such as fine signal waves are removed, and true shape signals are extracted by carrying out filtering in accordance with the present invention.

Figure 10A:
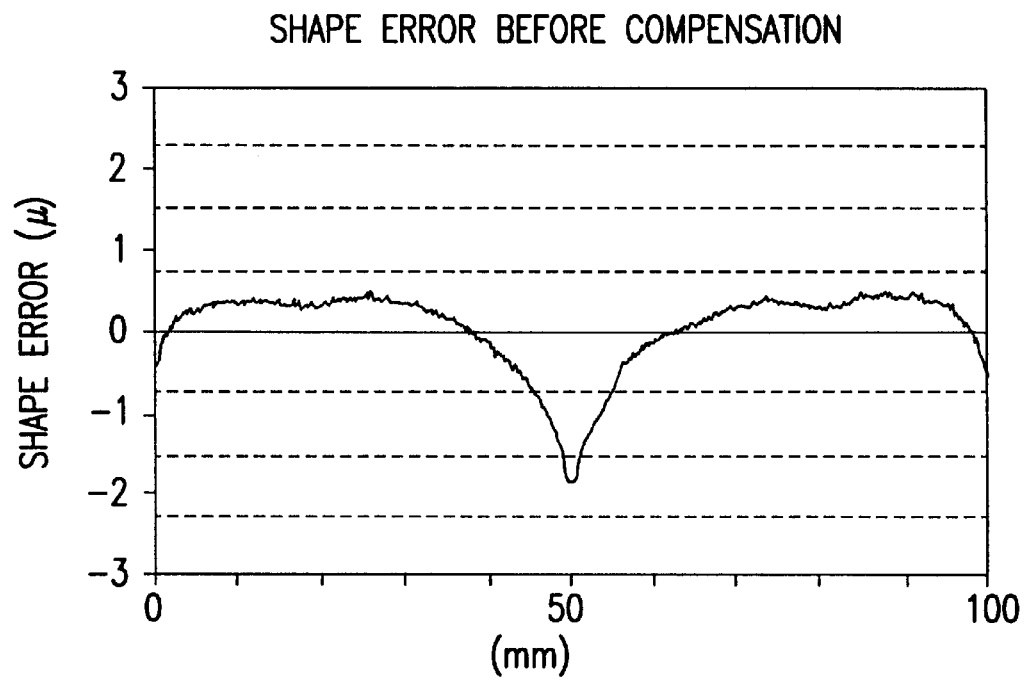
FIG. 10 illustrates error data obtained before and after shape compensation to be carried out in accordance with the present invention.
Figure 10B:
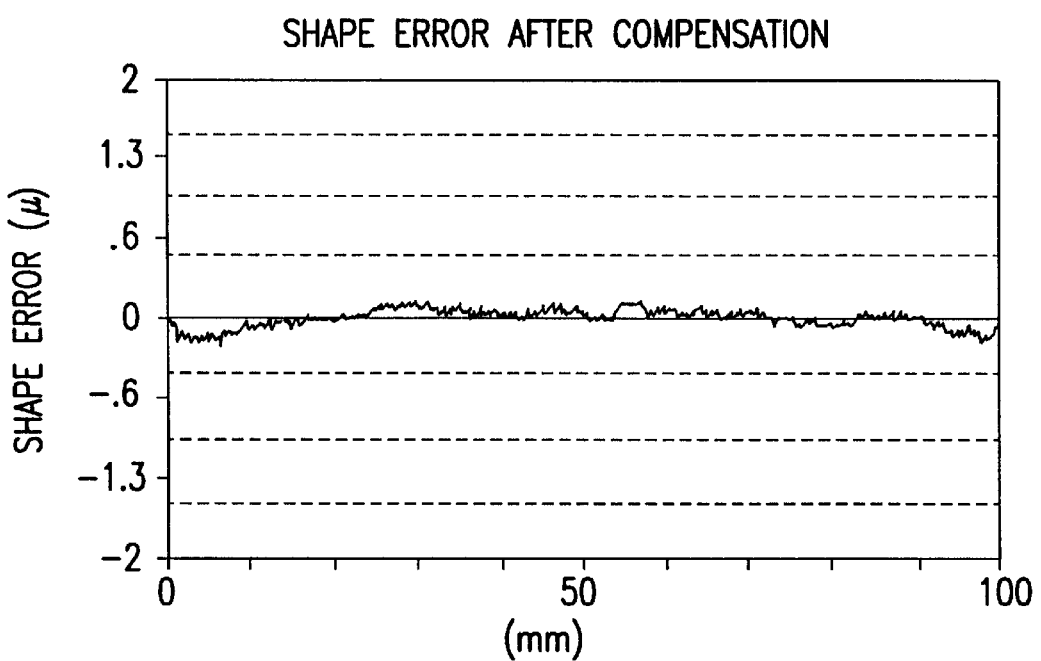

FIGS. 10(A) and (B) show error data before and after shape compensation to be carried out in accordance with the present invention, respectively. The shape error before the compensation was about 2.2 μm (A), but reduced down to about 0.39 μm (B) after the compensation. This is believed to be so because the shape controlling method in accordance with the present invention operates efficiently.

EXPERIMENTAL EMBODIMENT 2

As a grinding wheel, there were used cast iron bond diamond straight grinding wheels (φ75 mm×W 3 mm) of #1000 (average grain diameter is about 15 μm) and #4000 (average grain diameter is about 4 μm). As a shape measuring apparatus, there was used a laser-micro having a resolution of 10 nm. In an experiment, only the first type compensation shown in the first embodiment was carried out as compensation. The other conditions were the same as those in the experimental embodiment 1.
(Results of Experiment)

Figure 11A:
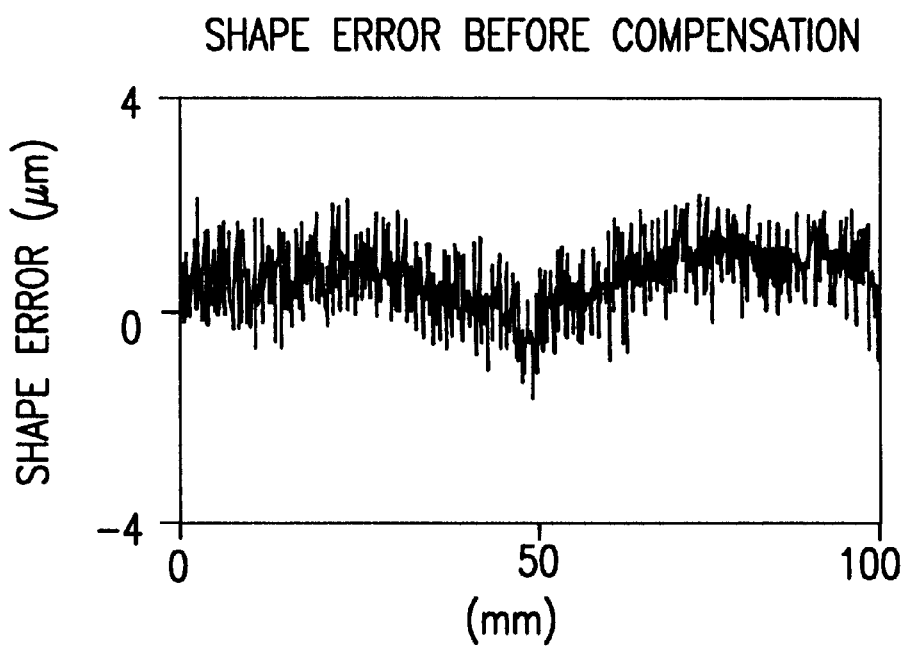
FIG. 11 illustrates error data obtained before and after shape compensation to be carried out in accordance with the present invention.
Figure 11B:
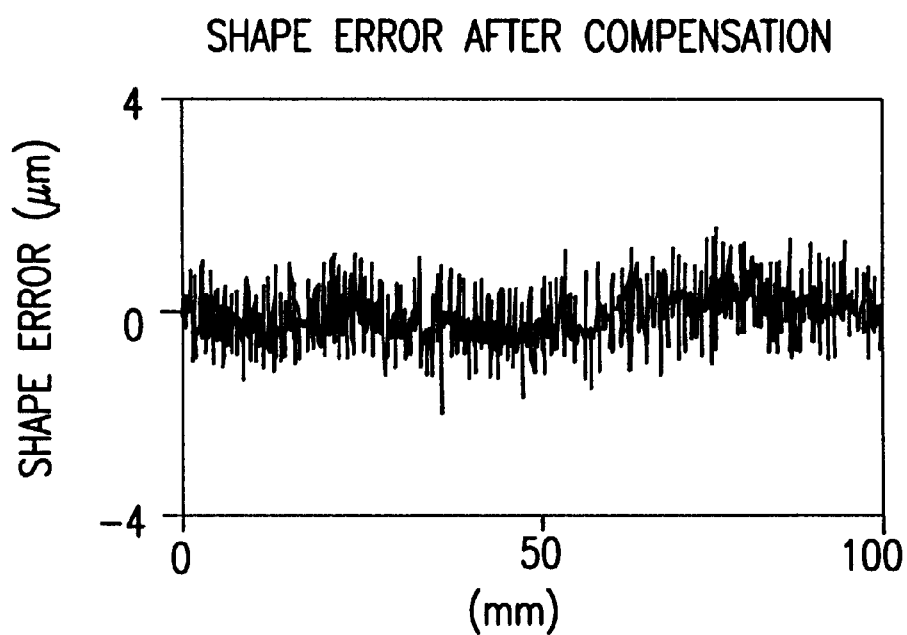

FIGS. 11(A) and (B) show error data before and after shape compensation carried out in accordance with the present invention, respectively. There appears a recess at the center in the measurement data (A), whereas the recess at the center remarkably reduces in the measurement data (B). This is believed to be so because the shape controlling method in accordance with the present invention operates efficiently.

It is to be understood that the present invention is not limited to the above mentioned embodiments. On the contrary, it is intended for the invention to include all alternatives, modifications and equivalents without departing from the gist of the present invention.

INDUSTRIAL APPLICABILITY

As described above, a shape controlling method and an NC processing apparatus using the method both made in accordance with the present invention provides great advantages. Namely, the present invention makes it possible to accomplish higher shape accuracy with a smaller number of processing steps, extract true shape signals out of measurement data, and avoid the mispositioning of a work caused by attaching/removing a work, and hence, is suitable for shape control in electrolytic dressing grinding.

We claim:

1. A method of grinding a work with a grinding wheel, comprising the steps of:

disposing an electrode spaced away from and facing an electrically conductive grinding wheel, applying a voltage across said grinding wheel and said electrode while making electrically conductive fluid flow between said grinding wheel and said electrode, numerically controlling a position of said grinding wheel, dressing said grinding wheel by electrolysis, grinding said work in accordance with command data given by a command function $Zx^{(i)}$, where i is an integer indicating the number of times that the command function has been carried out, to produce a ground surface, measuring a shape of the ground surface to obtain measurement data, filtering the measurement data to obtain shape error data $e_x^{(i)}$, compensating for errors in the command data $Zx^{(i)}$ with the shape error data $e_x^{(i)}$ to establish new command data $Zx^{(i+1)}$, and grinding said work again in accordance with the new command data $Zx^{(i+1)}$.

2. The method as set forth in claim 1, wherein said step of compensating for errors in the command data $Zx^{(i)}$ further includes the steps of calculating an expected value of command data expected to produce smaller shape error data by referring to past command data, and establishing new command data to be equal to the expected value.

3. The method as set forth in claim 1, wherein said step of compensating for errors in the command data $Zx^{(i)}$ includes the step of determining new command data $Zx^{(i+1)}$ in accordance with the equation $Zx^{(i+1)} = Zx^{(i)} - ex^{(i)}/i$.

4. The method as set forth in claim 1, wherein said filtering is carried out by means of a low pass filter utilizing frequency-domain technique by fast Fourier transform.

5. The method as set forth in claim 4, wherein said low pass filter removes higher-order frequency elements ranging from about 16 to about 64 cycle/100 mm.

6. The method as set forth in claim 1, wherein said step of compensating further comprises the steps of:

carrying out the method until at least three sets of command data and error data $(Zx', ex')$, $(Zx'', ex'')$, and $(Zx^{(i)}, ex^{(i)})$ are obtained, where i is an integer indicating the times that the command function has been carried out, and $i \geq 3$;

disregarding, for each data point x, the data set having the greatest absolute value of error, so that two data sets remain;

determining, for each data point x, whether the error data of the remaining two data sets has a common sign or a different sign;

if the error data of the remaining two data sets has a common sign, determining new command $Zx^{(i+1)}$ for each data point x according to the formula:

$$Zx^{(i+1)} = Zx^* - K \cdot ex^*$$

wherein $(Zx^*, ex^*)$ are the command data and error data of the remaining data set in which the error has the smallest absolute value, and K is a constant;

if the error data of the remaining two data sets has a different sign, determining new command data $Zx^{(i+1)}$ for each data point x according to the formula:

$$Zx^{(i+1)} = Zx^{} - [(Zx^{} - Zx^*)/(ex^{**} - ex^*)] \cdot ex^*$$

wherein $(Zx^*, ex^*)$ and $(Zx^{}, ex^{})$ are the command data and error data for the two remaining data sets.

7. An apparatus for grinding a workpiece, comprising:

an electrically conductive grinding wheel;

an electrode spaced away from and facing the grinding wheel;

a voltage device operably connected to apply a voltage between the grinding wheel and the electrode;

a fluid supply disposed to supply fluid between the grinding wheel and the electrode;

a workpiece holder;

a shape measuring device which generates shape data indicative of the shape of the workpiece held in the workpiece holder;

a filter operably connected to the shape measuring device, which filters the shape data and produces error data $e_x^{(i)}$;

a numerically-controlled positioning device arranged to relatively position the grinding wheel and a work piece held in the workpiece holder in accordance with a command function $Zx^i$, wherein i is an integer representing the number of times the command function has been carried out on a given workpiece;

a calculator which outputs new command data $Zx^{(i+1)}$ calculated from the command data $Zx^{(i)}$ and shape error data $e_x^{(i)}$.

8. An apparatus as set forth in claim 7, wherein said calculator outputs new command data $Zx^{(i+1)}$ in accordance with the equation $Zx^{(i+1)} = Zx^{(i)} - ex^{(i)}/i$.

9. An apparatus as set forth in claim 7, wherein said calculator outputs new command data $Zx^{(i+1)}$ as follows:

assembling at least three sets of command data and error data $(Zx^I, ex^I)$, $(Zx^{II}, ex^{II})$, and $(Zx^{(i)}, ex^{(i)})$, where i is an integer indicating the times that the command function has been carried out, and $i \geq 3$;

disregarding, for each data point x, the data set having the greatest absolute value of error, so that two data sets remain;

determining, for each data point x, whether the error data of the remaining two data sets has a common sign or a different sign;

if the error data of the remaining two data sets has a common sign, outputting new command $Zx^{(i+1)}$ for each data point x according to the formula:

$$Zx^{(i+1)} = Zx^* - K \bullet ex^*$$

wherein $(Zx^*, ex^*)$ are the command data and error data of the remaining data set in which the error has the smallest absolute value, and K is a constant;

if the error data of the remaining two data sets has a different sign, outputting new command data $Zx^{(i+1)}$ for each data point x according to the formula:

$$Zx^{(i+1)} = Zx^{} - [(Zx^{} - Zx^*)/(ex^{**} - ex^*)] \bullet ex^*$$

wherein $(Zx^*, ex^*)$ and $(Zx^{}, ex^{})$ are the command data and error data for the two remaining data sets.

\* \* \* \* \*

UNITED STATES PATENT AND TRADEMARK OFFICE
CERTIFICATE OF CORRECTION

PATENT NO : 5,910,040
DATED : June 8, 1999
INVENTOR(S): MORIYASU et al.

It is certified that error appears in the above-identified patent and that said Letters Patent is hereby corrected as shown below:

On the front page of the patent, please correct to read:

[22] PCT Filed: Aug. 14, 1996

Signed and Sealed this

First Day of August, 2000

Attest:

Q. TODD DICKINSON

Attesting Officer

Director of Patents and Trademarks